United States Patent [19]

Müller

[11] 4,050,558
[45] Sept. 27, 1977

[54] SYNCHRONIZING DEVICE

[75] Inventor: Robert Müller, Weissach, Germany

[73] Assignee: Dr. -Ing. H.c.F. Porsche Aktiengesellschaft, Germany

[21] Appl. No.: 691,702

[22] Filed: June 1, 1976

[30] Foreign Application Priority Data

May 30, 1975 Germany .............................. 2523953

[51] Int. Cl.² ...................... F16D 11/04; F16D 23/08
[52] U.S. Cl. ................................ 192/53 G; 192/114 T
[58] Field of Search .......................... 192/53 G, 114 T

[56] References Cited

U.S. PATENT DOCUMENTS

| 2,070,140 | 2/1937 | Peterson et al. | 192/114 T |
| 3,219,164 | 11/1965 | Henyon | 192/114 T |
| 3,303,915 | 2/1967 | Oesterle | 192/53 G X |
| 3,305,061 | 2/1967 | Duncan | 192/53 G X |

Primary Examiner—Allan D. Herrmann
Attorney, Agent, or Firm—Craig & Antonelli

[57] ABSTRACT

A synchronizing device for change-speed gears including a gearshift sleeve carrier mounted for rotation with a driven shaft and a gearshift sleeve axially slidable via a gear-tooth system over a corresponding gear-tooth system on the sleeve carrier to respective positions in engagement with clutch bodies of a gear to be shifted. In order to prevent unintentional disengagement of the gearshift sleeve from an engaged position interlocking the sleeve carrier and the clutch body, the interface of the gear-teeth at the sleeve carrier and the sleeve are geometrically configured to effectively bias or force the sleeve into the engaged position. In preferred embodiments, the engagement angle of the gearshift sleeve gear-tooth system is different than the engagement of the sleeve carrier gear system and the sleeve carrier gear-tooth system is chamfered by a predetermined angle at the edge thereof which is in contact when a sleeve is axially positioned so as to engage a clutch body on a gear freely rotatably mounted around the shaft which carries the sleeve carrier. In particularly preferred embodiments, the engagement angle of the gearshift sleeve is approximately 20° and the engagement angle of the gearshift sleeve carrier is approximately 15°, whereby, when the sleeve is in an engaged position, the engagement surfaces of the sleeve carrier and sleeve are such as to bias the sleeve toward the engaged position.

7 Claims, 4 Drawing Figures

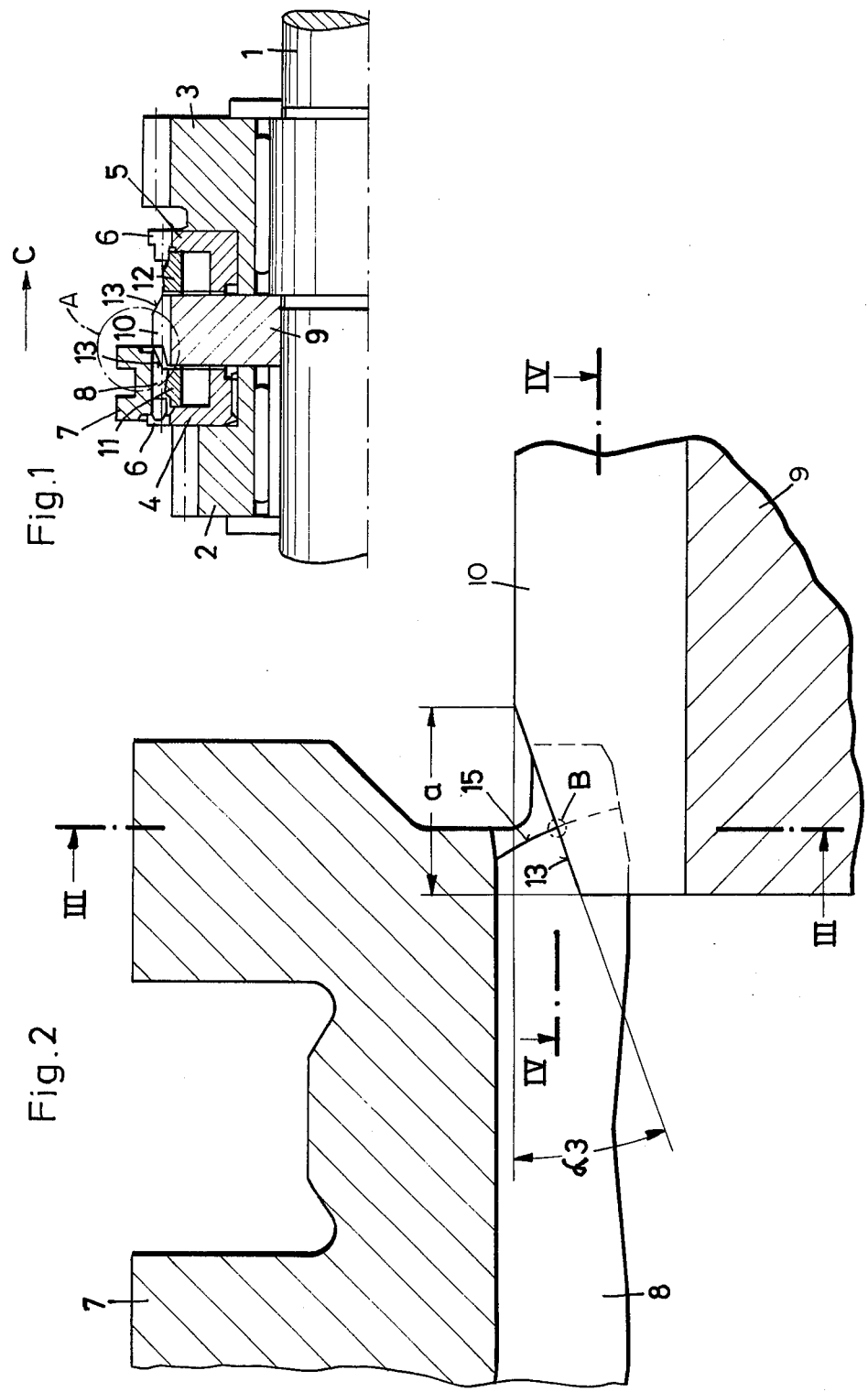

SYNCHRONIZING DEVICE

BACKGROUND AND SUMMARY OF THE INVENTION

The present invention relates to synchronizing devices, especially a synchronizing device for change-speed gears for use with motor vehicles and the like. The type of synchronizing device with which the invention is related includes a gearshift sleeve which is axially guidably carried on a gear-tooth system on a gearshift sleeve carrier such that the gearshift sleeve can be moved into and out of driving connection with a gear-tooth system of a clutch body on a gear to be engaged. See U.S. Pat. No. 3,504,775 for a showing of a prior art synchronizing device of the general type with which the present invention is concerned.

Prior art synchronizing devices of this type have experienced disadvantages "gear hopping" or inadvertent release of the gearshift sleeve from the engaged position with a gear. Investigations of this phenomena of "gear hopping" have revealed that it is caused primarily because of the elastic support of the connection of the transmission, including the synchronizing device, to the vehicle body. Because of this inherent elastic support, movements of the arrangement in a longitudinal direction, combined with thrust and torsional oscillations about the transverse axis, at times stimulate the system shift clutch, shift rod, shift lever and shift button into oscillations so that the oscillating shifting system may overcome the locking force in the gear system, with the consequent "gear hopping" or inadvertent momentary release of the gearshift sleeve from the clutch body of the engaged gear. It has been contemplated to provide means for ramming the shift gearing towards the rear in order to overcome this "gear hopping". While such an arrangement can in fact prevent "gear hopping", the relatively high manufacturing costs of such arrangements has proven to be especially disadvantageous.

A principal object of the invention is to provide a synchronizing device through which this "gear hopping" is positively avoided, and which synchronizing device can be manufactured at low cost.

According to the present invention, the gear-tooth system of the gearshift sleeve carrier and the gear-tooth system of the gearshift sleeve are geometrically configured so as to provide a biasing effect toward the engaged position of the gearshift sleeve, when it has been moved to such engaged position. In preferred embodiments, the gear-tooth system of the gearshift sleeve and sleeve carrier are provided with respective unequal angles of engagement at the interface thereof when the sleeve is in the gear engaged position. Additionally, according to preferred embodiments, the sleeve carrier is provided at this interface with a prescribed chamfer. By this means, inadvertent release of the sleeve or "gear hopping" is prevented with a device which is of low cost to manufacture and which can be utilized with many different types of synchronizing devices. The arrangement of the present invention positively avoids "gear hopping" even with a very elastic aggregate support of the shifting mechanism of a vehicle body.

In particularly preferred embodiments of the invention, the chamfer has an angle of 15° to 35° in relation to the axis of the gearshift sleeve carrier and extends over approximately one-fourth of the width of the gearshift sleeve carrier. In particularly preferred embodiments, the engagement angle $\alpha_1$ of the gearshift sleeve is larger than the engagement angle $\alpha_2$ of the gearshift sleeve carrier. In particularly preferred embodiments, the angle of engagement $\alpha_1$ of the gearshift sleeve is approximately 20° and the engagement angle $\alpha_2$ of the gearshift sleeve carrier is approximately 15°.

These and further objects, features and advantages of the present invention will become more apparent from the following description when taken in connection with the accompanying drawings which show, for purposes of illustration only, a single embodiment in accordance with the present invention, and wherein:

FIG. 1 is a partial longitudinal cross-sectional view through a gearshift sleeve gear system of a motor vehicle, showing a gear engaged, with a device constructed in accordance with the present invention;

FIG. 2 is a partial enlarged view of the cut-out "A" of FIG. 1;

DETAILED DESCRIPTION OF THE DRAWINGS

Figure 4:
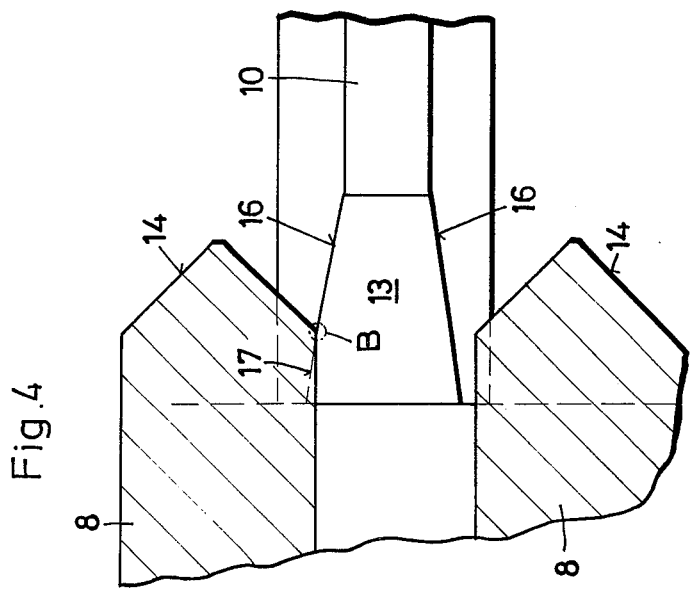
FIG. 4 is a cross-sectional view along line IV—IV of FIG. 3.

Referring to FIG. 1, gears 2 and 3 are mounted to be freely rotatable on an indicated gear shaft 1, but are fixed in the axial longitudinal direction. Gears 2 and 3 are in constant engagement with gears of a further gear shaft (not shown) and are positively connected with respective clutch members 4 and 5. The clutch members 4 and 5 are provided with a gear-tooth system 6 and are clutchably engageable with a gearshift sleeve 7. The gearshift sleeve 7 is provided at its inner surface with a gear-tooth system 8 and is arranged for axial movement on a gearshift sleeve carrier 9 which is also provided at its outer circumference with a gear-tooth system 10.

The gear-tooth system 8 of the gear shaft sleeve 7 and a gear-tooth system 10 at the gearshift sleeve carrier 9 are provided with different engagement angles, whereby the engagement angle of the gearshift sleeve 7, for example, $\alpha_1$ is approximately 20°, which is larger than the engagement angle of the gearshift sleeve carrier 9, of, for example, approximately 15°. The head surfaces of the teeth of the gear-tooth system 8 of the gearshift sleeve 7 operate together with synchronizing rings 11 and 12 which are arranged on the hub of the clutch members 4 and 5, respectively, the gears to be shifted. These synchronizing rings 11 and 12 preferably act together with known prior art means supporting the servo-action of the synchronizing rings, the details of this synchronizing structure not being shown in detail, since various embodiments thereof which are useful with the present invention are known to those skilled in the art.

Figure 3:
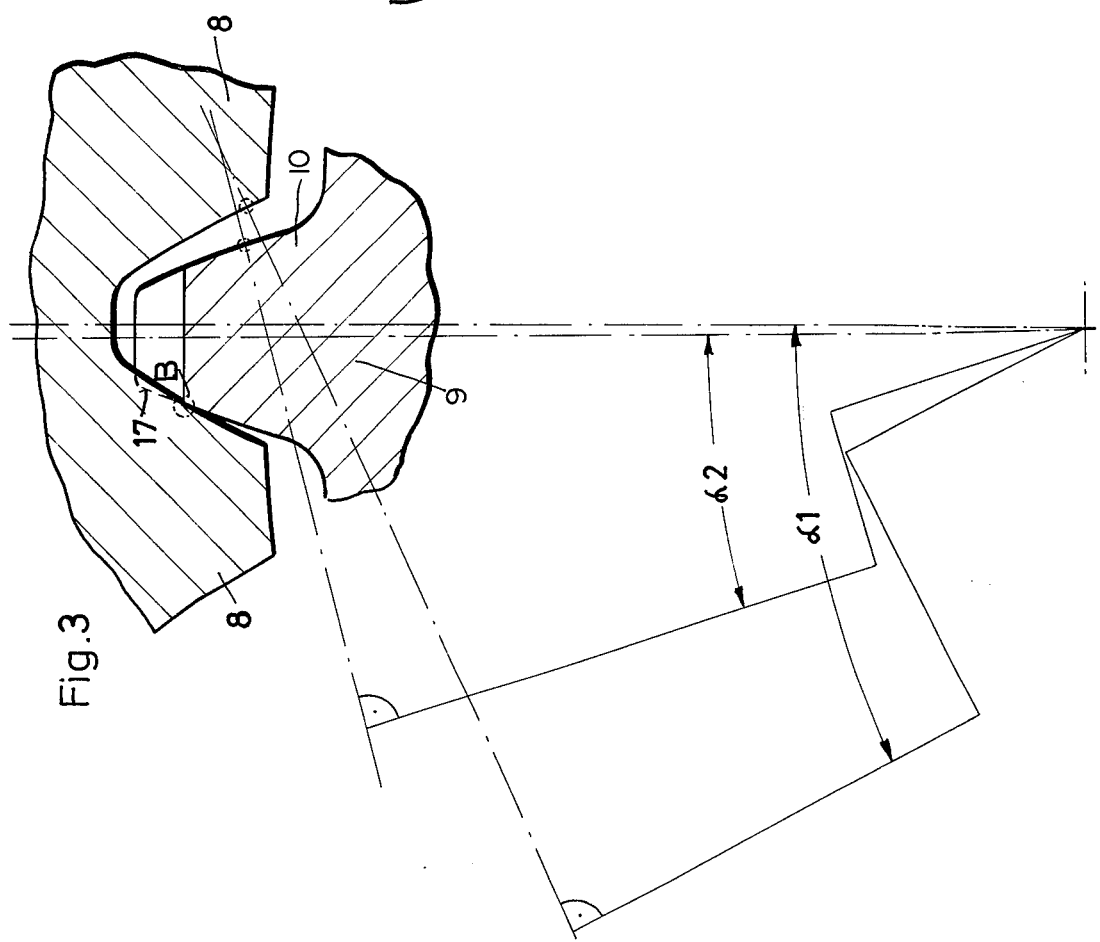
FIG. 3 is a cross-sectional view along line III—III of FIG. 2.

The gear-tooth system 10 of the gearshift sleeve carrier 9 is provided at the interface with a definite chamfer 13 having an angle of $\alpha_3$ of about 15° to 35° in relation to the axis of the gearshift sleeve carrier 9. This section 13 extends over a distance "a" approximately one-fourth of the width of the gearshift sleeve carrier 9. The teeth of the gear-tooth system 8 of the gearshift sleeve 7 at the interface (position of engagement of the respective gear teeth when the sleeve is in the shown gear-engaged position) come to a point 14 (FIG. 4) and define a cutting edge 15 (FIG. 2). The working point B, shown in FIGS. 2, 3 and 4 is defined with the gear engaged between the cutting edge 15, on the one hand, and one of the chamfered edges 16, dependent on the direction of the rotation of the gearshift sleeve carrier 9, on the other. From the working point B to the corresponding interface of the gearshift sleeve carrier 9, an undercutting edge, designated as 17, is formed by the above-described shape of the gear-tooth systems 8 and 10.

During shifting of the gear, the gearshift sleeve 7 is moved in an axial direction on the gearshift sleeve carrier 9 into the positions shown, for example, in FIG. 1. The head surface of the teeth of the gear-tooth system 8 first come into friction-contact with the synchronizing ring 11 through which, in a known way, synchronism between the gearshift sleeve 7 and the clutch member 4 of the gear 2 to be shifted, is established, before the gearshift sleeve 7 is axially moved further to the left to be coupled to the clutch member 4. Through the undercut edge 17, with the engaged gear, the gearshift sleeve 7, through the above-noted configuration of the gear-tooth system of the gearshift sleeve carrier, the pointing of the teeth of the gear-tooth system of the gearshift sleeve, and the different engagement angle between the gear-tooth system of the gearshift sleeve and the gear-tooth system of the gearshift sleeve carrier, capable of influencing the locking force, is effectively prevented from being moved axially in the direction of arrow C (FIG. 1), whereby inadvertent release of the gear of "gear hopping" is prevented.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of appended claims.

I claim:

1. Synchronizing device for change-speed gears comprising:
    a gearshift sleeve carrier mounted for rotation with a shaft, said sleeve carrier having a sleeve carrier gear-tooth system;
    a clutch body part of a gear to be shifted, said clutch body part including a clutch body gear-tooth system; and
    a gearshift sleeve having a gearshift sleeve gear-tooth system drivingly connected with said sleeve carrier gear-tooth system and selectively drivingly engageable with said clutch body gear-tooth system upon axial movement of said gearshift sleeve, said gearshift sleeve gear-tooth system and said sleeve carrier gear-tooth system being engageable with one another at engagement surfaces which are in contact with one another when said gearshift sleeve is in a position drivingly engageable with said clutch body gear system;
    wherein said engagement surfaces are geometrically configured to bias said gearshift sleeve in a direction corresponding to engagement to bias said gearshift sleeve in a direction corresponding to engagement thereof with said clutch body gear system, wherein, at the engagement surfaces, the engagement angle of the gearshift sleeve gear-tooth system is different than the engagement angle of the sleeve carrier gear-tooth system whereby unintentional disengagement of said gearshift sleeve from said clutch body gear system is prevented.

2. Synchronizing device according to claim 1, wherein the sleeve carrier gear-tooth system has a defined chamfer and the area of the engagements differ thereof when the sleeve is in the engaged position.

3. Synchronizing device according to claim 2, wherein the chamfer extends at an angle in the range of 15° to 35° in relation to the axis of the gearshift sleeve carrier 9 and extends from the axial end of the sleeve carrier a distance of one quarter of the axial length of the gearshift sleeve carrier.

4. Synchronizing device according to claim 4, wherein the engagement angle of the sleeve gear-tooth system is larger than the engagement angle of the sleeve carrier gear-tooth system.

5. Synchronizing device according to claim 1, wherein the engagement angle of the sleeve gear-tooth system is larger than the engagement angle of the sleeve carrier gear-tooth system.

6. Synchronizing device according to claim 5, wherein the engagement angle of the sleeve gear-tooth system is approximately 20° and the engagement angle of the sleeve carrier gear-tooth system is approximately 15°.

7. Synchronizing device according to claim 4, wherein the engagement angle of the sleeve gear-tooth system is approximately 20° and the engagement angle of the sleeve carrier gear-tooth system is approximately 15°.

* * * * *